|| United States Patent [19]
Josephson

[11] Patent Number: 4,851,251
[45] Date of Patent: Jul. 25, 1989

[54] PROCESS FOR MASKING A COOKED FLAVOR IN HEATED MILK

[75] Inventor: David B. Josephson, South Lebanon, Ohio

[73] Assignee: Mallinckrodt, Inc., St. Louis, Mo.

[21] Appl. No.: 234,569

[22] Filed: Aug. 22, 1988

[51] Int. Cl.$^4$ .................... A23L 1/015; A23C 9/14
[52] U.S. Cl. .................... 426/580; 426/491; 426/495; 426/598
[58] Field of Search ............ 426/491, 495, 580, 598, 426/529

[56] References Cited

U.S. PATENT DOCUMENTS

| | | | |
|---|---|---|---|
| 2,176,023 | 10/1939 | Musher | 426/580 |
| 2,709,137 | 5/1955 | Freund | 426/580 |
| 3,623,894 | 11/1971 | Samuelsson | 426/580 |

Primary Examiner—Donald E. Czaja
Assistant Examiner—Helen Pratt
Attorney, Agent, or Firm—Wood, Herron & Evans

[57] ABSTRACT

A method of masking the cooked off-flavor of ultra high temperature processed milk which comprises introducing into the milk, either before or after the heat treatment, an effective amount of caraway to mask the cooked off-flavor.

7 Claims, No Drawings

PROCESS FOR MASKING A COOKED FLAVOR IN HEATED MILK

Pasteurized milk is produced by exposure of the milk to a temperature usually at about 140° C. in order to destroy certain microorganisms and prevent or arrest fermentation. However, increased heat treatment, for example use of longer holding times and higher temperatures, desirably increases the probability of sterilization and long term flavor stability. Such processing at temperatures in excess of about 150° F. is referred to in the art as ultra high temperature processing (UHT) of liquid milk. The benefits obtained by UHT processing of milk are offset by the increased cooked flavor. Various techniques have been attempted to overcome or reduce the cooked flavor such as allowing for the slow oxidation of undesirable off-flavor compounds to give the milk an acceptable flavor quality. Even these techniques of oxidation and catalyzed oxidation that produce more acceptable flavor quality often still provide a difference in taste from pasteurized milk.

SUMMARY OF THE INVENTION

This invention is directed to a new technique for masking the cooked flavor or other off-flavor properties in liquid milk produced by high temperature or UHT processing. In particular, it has been found that the introduction of caraway into such milk, either before or after the heat treatment, will eliminate the cooked off-flavor and provide the milk with a flavor typical of pasteurized milk.

The method in its broader aspects is directed to a process of treating milk having a cooked flavor, usually characteristic of UHT liquid milk, which comprises masking the flavor by the introduction of caraway. As indicated above, caraway may be added either before or after the heat treatment. In a preferred form, liquid milk having a cooked flavor is masked by treating the milk with ground caraway seeds. The caraway seed residue, after treatment, is preferably removed from the milk by filtration. Freshly ground caraway seeds may be introduced into the off-flavored milk after the heat treatment on an effective parts basis to eliminate the cooked off-flavor. Tests have demonstrated that the cooked off-flavor may be eliminated from liquid milk by introduction of ground caraway at a level on the order of about 100 ppm or 0.01% by weight of the milk. Milk treated at such levels lacks the cooked off-flavor and tastes like pasteurized milk. At levels higher than this minimum effective amount, there may be a development of very slight caraway flavor and sweetness.

DETAILED DESCRIPTION

The following examples exemplify the best mode of practicing this invention. These examples are considered to be illustrative and not limiting with respect to the broader aspects of this invention.

Whole milk is treated by ultra high temperature processing at 280° F. with a residence time of 4-5 seconds. This UHT treated milk served as a control having the typical cooked off-flavor. Freshly ground caraway seeds were introduced into samples of milk prior to heat treatment and the results are reported in Table I.

TABLE I

| EXAMPLE | FLAVOR PROFILE/DESCRIPTION |
|---|---|
| (1) Control<br>3000 gms milk | Typical cooked off-flavor |
| (2) Treatment #1<br>0.23 gms (77 ppm)<br>freshly ground<br>caraway<br>3000 gms milk | Slight cooked off-flavor |
| (3) Treatment #2<br>0.30 gms (100 ppm)<br>freshly ground<br>caraway<br>3000 gms milk | Lacks cooked off-flavor;<br>tastes like typical<br>pasteurized milk |
| (4) Treatment #3<br>0.37 gms (123 ppm)<br>freshly ground<br>caraway<br>3000 gms milk | Lacks cooked off-flavor;<br>very slight caraway sweet<br>taste |
| (5) Treatment #4<br>0.54 grams (180 ppm)<br>freshly ground<br>3000 gms milk | Lacks cooked off-flavor;<br>slight caraway sweet<br>taste |

From the above experiments, it will be understood that caraway seed may be ground and introduced into UHT milk in effective levels to overcome the cooked off-flavor. The caraway is effective when added either pre- or post-sterilization of the liquid milk. Having described the invention and its most preferred form, there will be obvious variations to a person of ordinary skill in this art.

What is claimed is:

1. A method of masking the cooked off-flavor in liquid milk processed by heat at temperatures in excess of about 150° F. which comprises providing in the heat processed milk an effectived amount of caraway to mask the cooked off-flavor.

2. The method of claim 1 wherein the caraway is added to the milk before heat processing.

3. The method of claim 1 wherein the caraway is added to the milk after heat processing.

4. The method of claim 1 wherein a residue of the caraway is removed from the milk.

5. The method of claim 1 wherein caraway seeds are ground and introduced into the liquid milk.

6. The method of claim 5 wherein said ground seeds are contained in an effective amount of about 0.01% by weight of the milk.

7. A method of masking the cooked off-flavor in liquid milk processed by ultra high temperatures which comprises providing in the heat processed milk having the cooked flavor an effective amount of ground caraway seeds to mask the cooked off-flavor and thereafter removing a residue of the seeds from the milk.

* * * * *

UNITED STATES PATENT AND TRADEMARK OFFICE
CERTIFICATE OF CORRECTION

PATENT NO. : 4,851,251
DATED : July 25, 1989
INVENTOR(S) : David B. Josephson

It is certified that error appears in the above-identified patent and that said Letters Patent is hereby corrected as shown below:

Column 1, line 6 "140°C" should read --140°F--.

Signed and Sealed this

Twelfth Day of June, 1990

Attest:

HARRY F. MANBECK, JR.

Attesting Officer

Commissioner of Patents and Trademarks